Figure 1:
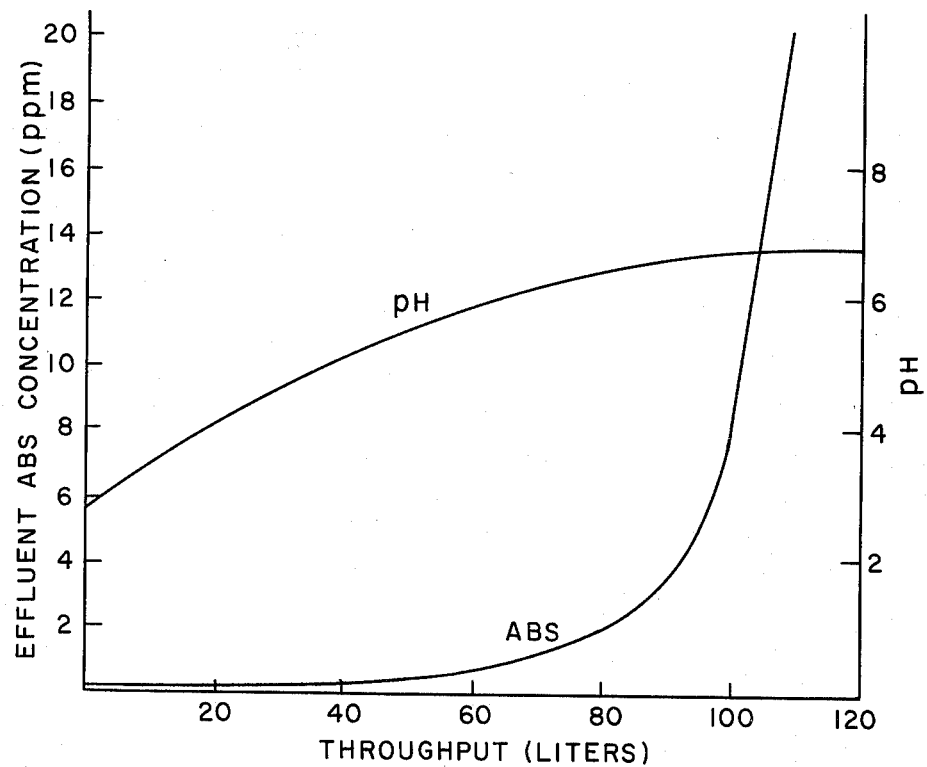

INVENTOR.
IRVING M. ABRAMS
BY C. Thomas Cross

3,232,867
REMOVAL OF ANIONIC SURFACTANTS FROM LIQUIDS
Irving M. Abrams, Redwood City, Calif., assignor to Diamond Alkali Company, Cleveland, Ohio, a corporation of Delaware
Filed Aug. 19, 1963, Ser. No. 302,780
14 Claims. (Cl. 210—37)

This invention relates to water treatment, and more particularly to a new and improved method for the removal of contained anionic detergents and surfactants from water.

This application is a continuation-in-part of copending application Ser. No. 136,770, filed September 8, 1961, now United States Patent No. 3,123,553.

Current consumption of synthetic surfactant and detergent washing products is in the range of billions of pounds annually. Because these detergents materially reduce the surface tension of the water in which they are dissolved and cause the formation of stable foams even when present in concentrations as low as one part per million, their presence in industrial and municipal waste disposal systems has become a severe nuisance. The problem is aggravated by the fact that the surfactants are not effectively digested by microorganisms used for sewage disposal; they may even impair the proper function of activated sludge plants. Frequently, surfactant residues are found in water wells located near septic tanks and may give rise not only to foam, but unpleasant tastes as well. They also find their way into waste streams and thence into fresh water streams and lakes, rendering the water unpalatable and decreasing its oxygen content to the point where fish and other forms of marine life are unable to survive.

Alkyl benzene sulfonates, hereinafter referred to as ABS, comprise the bulk of the surfactants in current use. These compounds generally correspond to the formula:

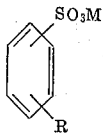

wherein M represents a metallic cation, such as sodium, potassium, calcium, and the like, usually sodium; and R represents an alkyl chain of from about 8 to about 22 carbon atoms, most frequently from about 10 to about 14 carbon atoms. These products are generally referred to as a form of "anionic surfactant" since the organic anion gives rise to the surfactant properties. Thus, anionic surfactants are those which carry a negative ionic charge when in solution. These compounds, usually derived from petroleum products, are commonly used as detergents in household and industrial cleaning formulations. Extremely large quantities are used in laundering and similar washing operations.

The degree of biodegradability of ABS generally varies inversely with the degree of branching of the alkyl radical. Thus, an ABS molecule with a linear alkyl chain is relatively biodegradable, while one with a highly branched chain is likely to survive virtually all digestive sewage disposal attempts. Much research effort is currently being devoted to the development of more readily biodegradable surfactants.

The comparatively few methods available for the removal of ABS from water are, for the most part, based on (1) digestion by microorganisms, (2) separation by frothing, (3) chemical interaction with oxidizing agents or cationic surfactants, and (4) adsorption on solids.

In none of these methods heretofore, has the removal been complete. In the digestive process, as indicated above, removal of ABS is usually ineffective. Separation by frothing can remove up to 84 percent. In a recent investigation of solid adsorbents from ABS (Charles E. Renn and Mary F. Barada, Journal American Water Works Assn., 53, 129–34 (1961), activated carbon was found to be the most effective of the adsorbents. However, relatively large quantities of this adsorbent were required to remove ABS from waters containing one p.p.m. or more of ABS; even large amounts of carbon (more than 100 parts per million parts of water) were not totally effective. Thus, the use of this agent for the removal of ABS in the concentration range of 1 to 10 p.p.m. appears to be too expensive to be practical.

In copending application, Ser. No. 136,770, applicant has shown that ABS can be effectively removed from water by contacting the same with an anion-exchange material, preferably a strong-base anion-exchange resin. Contrary to expectation, the ABS anions are adsorbed in preference to other anions. Thus, water containing only a few parts per million of ABS in admixture with significantly larger quantities, e.g., several hundred p.p.m., of chloride, sulfate, and the like can be treated with an anion-exchange resin and the resin will exhibit an unusually high capacity for the ABS. This advantage is, however, accompanied by the disadvantage that the ABS is difficult to remove from the resin because the affinity of the strong-base anion exchanger for ABS is so high. It has been found necessary to elute the exhausted strong-base resin with a polar organic solvent and a strong mineral acid.

A principal object of this invention, therefore, is to provide a convenient, safe and inexpensive method for the removal of ABS and other anionic surfactants from water.

Another object is to provide a method whereby the surfactant may be easily recovered for disposal or reuse.

A still further object is to provide a simple and convenient method of regenerating the ion exchanger.

Still other objects will in part be obvious and will in part appear hereinafter.

According to this invention, the removal of the anionic surfactant is effected by contacting the surfactant-containing water, which may contain both cations and anions, with a weak-base anion-exchange resin in the acid, i.e., acid-salt, form. In accordance with the invention, the surfactant may then be removed from the resin simply by contacting it, as by eluting it, with an aqueous alkali solution, without the necessity of employing a polar solvent. Thus, the method of this invention broadly comprises removing anionic surfactants from an aqueous liquid by contacting the liquid with a weak-base anion-exchange resin in the acid-salt form.

It has been found that, surprisingly, a weak-base resin in the acid-salt, e.g., chloride or sulfate, form (acid-exhausted weak-base resin) has a substantially higher capacity to adsorb ABS and other detergent anions than does a resin (whether strongly or weakly basic) in the free-base or hydroxide form. Moreover, the adsorbed ABS can be recovered quantitatively by eluting the exhausted resin with aqueous alkali. This procedure is a substantial and unexpected improvement over prior art methods which require the use of organic solvent systems for elution.

In the practice of the method of this invention, the contaminated aqueous solution can be any water containing anionic surfactants. The most common contaminant is the ABS-type surfactant. Among the aqueous liquids which may be treated by the practice of this invention are domestic and industrial sewage effluents, laundry waste effluents, ground water supplies and surface water supplies. In general, any ion-exchange process is more effective when the liquid being treated is clear, i.e., free of suspended solids. Thus, it is preferred that the liquid to which the method of this invention is to be applied first be treated to remove any suspended solids. This can be done by well known methods such as coagulation, settling or filtration, or by combinations of these or other methods.

Contaminated waters such as laundry waste effluents frequently contain very high concentrations of anionic surfactants. Since the cost of the practice of this invention is directly related to the amount of surfactant to be removed, it is advantageous in such cases to subject the water to a preliminary treatment to remove the bulk of the contaminants prior to the ion-exchange step. This prior treatment can usually be combined with the clarification operation. For example, a laundry waste effluent is generally highly turbid and may contain from 50 to 150 p.p.m. of ABS. It is well known that by treating such a solution with small quantities of alum (and frequently an alkali), followed by coagulation, settling and filtration (usually with the aid of diatomite and/or powdered carbon), the solution is easily clarified and the ABS level is reduced to within the range of 10 to 20 p.p.m. A domestic sewage effluent may be low in ABS, but is frequently turbid. Therefore, it should be clarified prior to the ion-exchange treatment.

The waters to be treated by the process of this invention generally may have anionic surfactant concentrations ranging from zero to 500 p.p.m. However, it is usually preferred that the surfactant level of the influent to the resin be less than about 30 p.p.m. Since 0.5 p.p.m. of ABS is the upper limit set for drinking water by the U.S. Public Health Service, it is ordinarily not necessary to treat waters containing less than this concentration. Thus, the method of this invention is of primary interest in the treatment of water containing ABS in a concentration between about 0.5 and 30 p.p.m.

ABS levels in most surface and ground water supplies are below 0.5 p.p.m. On occasion, the levels in some rivers go above 1 p.p.m. As the use of common household detergents increases, the frequency of these occasions is increasing. In general, the ABS level in raw domestic sewage varies from about 1 to 10 p.p.m. Primary treatment methods generally remove little or no ABS. Conventional activated sludge treatment can be expected to remove about half of the ABS. Thus, clarified domestic sewage is well suited to treatment by the method of this invention.

The anion-exchange resins to be used for ABS removal can be any water-insoluble material containing weakly basic groups which can function to adsorb strong acids such as hydrochloric acid or sulfuric acid, but are preferably weak-base essentially insoluble, infusible synthetic resins containing a crosslinked polymeric matrix and primary, secondary or tertiary amine groups. Such resins may include, for example, phenolformaldehyde condensates into which amine groups are introduced by reaction with polyethylene amines; chloromethylated styrenedivinylbenzene copolymers aminated with ammonia, primary or secondary amines; condensates of epichlorohydrin and ammonia or amines; aminolyzed copolymers of esters of acrylic or methacrylic acids and a crosslinking agent such as divinylbenzene; condensates of m-phenylene diamine and formaldehyde, and the like. Numerous suitable resins are commercially available. Examples of such products are Duolite A-2, A-4, A-6, A-7 and A-30B (Diamond Alkali Company); Amberlite IR-45, XE-168 and XE-225 (Rohm & Haas); Nalcite WBR and WGR (Nalco Chemical Co.); Lewatit MP-60 (Farbenfabriken Bayer); and Ionac A-300 (Ionac Chemical Co.). Resins having a macroporous structure have been found to be particularly efficacious.

A preferred weak-base resin for the practice of this invention is Duolite A-7 (highly porous phenolic weakly basic anion-exchange resin) which adsorbs up to 150 grams of ABS per liter (equivalent to 4,250 grams, or 9.4 lbs. per cubic foot) of resin. The regeneration-exhaustion cycle can be repeated, e.g., for 8 times, with no perceptible loss in operating capacity.

Expressed in still another way: one liter of wet Duolite A-7 is equivalent to 225 grams of dry resin, which adsorbs up to about 150 grams of ABS, thus giving a capacity of more than 0.6 gram of ABS per gram of dry resin. This can be contrasted with the better grades of granular activated carbon which adsorb about 0.15 gram of ABS per gram of dry solid in breakthrough tests.

Commercial ion-exchange resins are generally made in the form of irregular granules or of beads, most frequently in the range of 10-60 mesh (U.S. Standard Sieves Series). This particle-size range is preferred for the method of this invention, although coarser or finer particles may be used. Other resin shapes, such as rods, films, screens, etc., are also suitable.

It is important that there be adequate contact between the liquid being treated and the ion-exchange resin. In the preferred embodiment of this invention, continuous flow of the solution containing the ABS to be removed is effected through a vertical column containing a bed of the anion-exchange granules wherein the ABS is removed by adsorption or exchange. The preferred particle size for optimum hydraulic flow in such columns is in the 20-50 mesh range. Alternatively, the resin can be added to the solution, stirred, then removed by filtration or decantation. In such cases, a smaller particle-size range would be advantageous. It is within the scope of this invention to use other physical forms of the resin. For example, the anion-exchange resin can be incorporated in a film, membrane, filter cloth, or filter aid and the solution containing the ABS to be removed passed through such a septum, thereby effecting removal.

The direction of flow of the liquid through the mass of solid anion-exchange resin is immaterial. For example, the liquid can go through a column of granules either down-flow or up-flow, desirably down-flow. Pressure flow may be desirable in either case, but in the case of down-flow, gravity flow alone is usually sufficient. The dimensions of the column are not critical, although a minimum resin depth (in the direction of liquid flow) of about eight inches is preferred. The maximum height of such a column is limited only by the pressure drop which occurs in the flow of liquid through the column. In ion-exchange practice, resin column depths seldom exceed six feet, although some beds of adsorbents such as carbon may be thirty feet or more. The depth of the column of resin granules and the flow rate through the column need only be such that the ABS is substantially completely removed up to the capacity of the resin, with substantially no leakage into the effluent leaving the column.

The optimum resin-liquid contact time varies with the composition, porosity and particle size of the resin, the temperature and composition of the liquid, and other variables of a similar nature. In general, the contact time should be at least 30 minutes and preferably 50 minutes or more. In terms of flow through a vertical column, the rate should be no more than about 10 gallons per minute per cubic foot of resin, and preferably less than 5 gallons per minute/cu. ft. Excellent results have been obtained with laboratory columns and synthetic solutions at a flow rate of about 1 gallon per minute/cu. ft. Higher capacities are generally obtained with longer contact times, or slower flow rates. If a film, membrane, or filter cloth is used, slower flow rates will be required compared to the same amount of anion-exchange resin in a column, in order to keep leakage of ABS into the effluent at a minimum.

According to the preferred method for the practice of this invention, a sample of water containing surfactant dissolved therein is passed downward through a column of a porous weak-base resin in the chloride or sulfate (bisulfate) form, at a flow rate of about one gallon per minute per cubic foot of resin. The initial fractions of effluent are virtually free of surfactant. As the run continues, the surfactant concentration in the effluent gradually increases as shown in FIGURE 1 of the accompanying drawing wherein there is plotted effluent concentration and pH against throughput. When the maximum allowable surfactant concentration in the effluent is reached, the run is discontinued.

The early effluent fractions from the resin in the acid-salt form may have a pH as low as about 2.5, due to hydrolysis of the resin's amine-salt groups. As shown in FIGURE 1 of the drawing, the pH gradually increases as treatment is continued, until the neutral point (pH 7) is approached. Near the end of the run, influent pH and effluent pH are the same.

Figure 2:
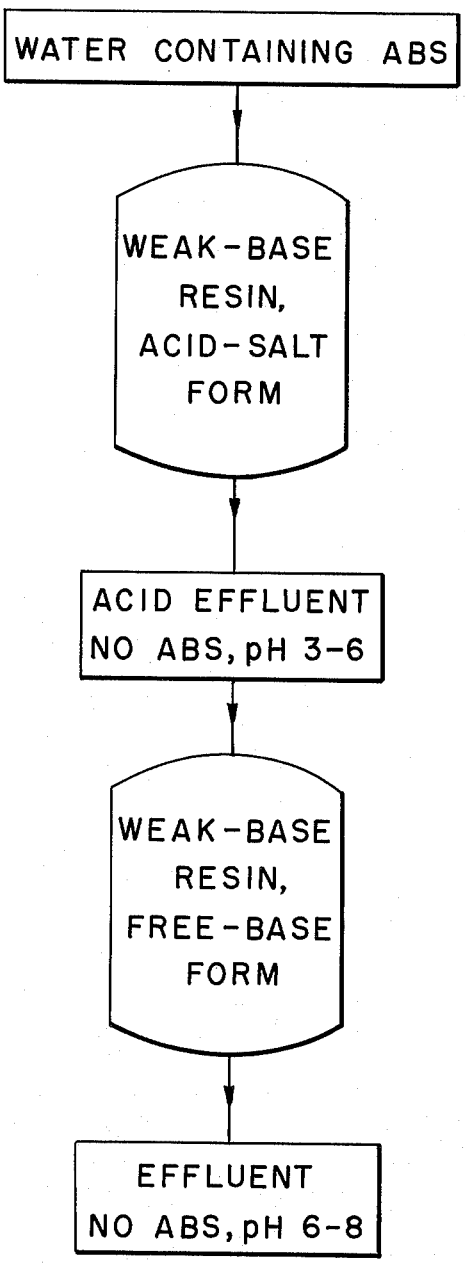

If an acid effluent is objectionable, the effluent may be neutralized by passing it through a second column containing a weak-base resin in the free-base form, as shown schematically in FIGURE 2 of the drawing. This second column serves a double purpose, in that it not only increases the pH of the solution, thus serving to facilitate removal of any acid escaping the first column, but also acts as a scavenger for traces of surfactant and other material which may remain in the effluent from the first column. In the treatment of sewage effluent, the second column also serves to scavenge organics and thus reduce COD (chemical oxygen demand). When the first column is exhausted or saturated with surfactant, most of the acid will have been transferred to the second column, which may then be placed in the first position without further acid treatment. The first column may be regenerated with alkali, as described hereinafter, to remove the surfactant, then rinsed with water and placed in the second position. Thus it will be appreciated that this method of operation illustrates another embodiment of the invention.

When the adsorption run has been completed, the surfactant is removed from the resin by elution with dilute aqueous alkali. The term "alkali," as used herein, is intended to refer to alkaline materials such as alkali metal hydroxides, e.g., the hydroxide of sodium, potassium, lithium, etc. as well as materials such as lime, ammonia, sodium carbonate, sodium silicate and the like; sodium hydroxide is preferred. The concentration of the alkaline solution is not critical but is preferably about 2 to 10 percent, by weight. More specifically, 3 to 8 percent is preferred.

The amount of aqueous alkali required to elute all of the surfactant from the resin depends on a number of factors, notably the composition and capacity of the resin used, the temperature and contact time of the alkali, and the degree of exhaustion of the resin. In general, for most commercial anion-exchange resins which have been thoroughly exhausted with ABS, not more than 10 pounds of NaOH will be required per cubic foot of resin. Most frequently, the amount will range from 3 to 6 pounds/cu. ft. If a low-capacity resin is used, or if the resin is only partially exhausted, 1 to 2 pounds/cu. ft. may be enough to remove the ABS completely.

The resin-alkali contact time should generally be about 50 minutes, corresponding to a flow rate of one gallon per minute per cubic foot of resin, or less. If the aqueous alkaline solution is heated, the flow rate may be materially increased. The upper temperature limit is about 60° C.; above this temperature, the resin becomes increasingly unstable in an alkaline medium.

When the warm alkaline regenerant effluent is allowed to cool, the solubility of ABS in the alkali is exceeded and the surfactant separates out in a second phase. By decanting off the supernatant liquid and drying the remaining solid, 50 percent or more of the ABS can be recovered. The yield of surfactant can be increased by adding a neutral salt, such as sodium sulfate, to the alkaline effluent. In this way, recoveries approaching 90 percent can be attained.

After the resin has been alkali-washed to remove the ABS, it may be reconverted to the acid-salt form by means of dilute aqueous mineral acid such as hydrochloric and/or sulfuric acid, diluted with water, and used again for removal of ABS. This generally can be achieved by using the stoichiometric amount (corresponding to the total capacity of the resin) plus 10 percent. Excess acid is rinsed off and the resin is again ready for adsorption of anionic surfactant.

In carrying out tests to determine the efficiency of ABS removal, the water containing this ingredient is passed through the column of resin. To determine qualitatively whether ABS is present in the effluent, a sample in a test tube is merely shaken to determine the presence or absence of foam. If none is present in the effluent, whereas a substantial foam is produced on shaking the influent, it can be concluded that the ABS is being effectively removed. A large number of quantitative methods have been devised for determining ABS levels in water. One such method is described in the Journal of the American Water Works Association, 50, 1343 (1958). This method comprises adding methylene blue to the solution containing ABS, thereby forming a blue-colored complex. The color is extracted with chloroform and measured in a Beckman DU Spectrophotometer. Such method is sufficiently accurate for the purposes in these tests.

The following examples are given in order that those skilled in the art may more fully understand the invention and the preferred means for carrying the same into effect. For the purpose of comparison, Examples 1 and 2 illustrate surfactant removal by a weak-base resin in the free-base form. The Duolite A–7 resin used in these examples is a granular, highly porous, phenolic weak-base (acid absorbent) resin containing primary, secondary and tertiary amine groups.

EXAMPLE 1

One-hundred milliliters (tamped volume) of Duolite A–7 resin is placed in a glass column, ⅞-inch I.D. and 20 inches tall. The resin is regenerated by treatment with an excess of 4-percent sodium hydroxide in water. The excess alkali is washed out and a solution containing 100 p.p.m. of ABS and 150 p.p.m. of $Na_2SO_4$ in Redwood City, California, tap water is passed through the column at a rate of 8 bed-volumes per hour (1 gallon per minute/cu. ft.). The ABS level of the effluent is determined at frequent intervals by analysis, using the methylene blue-chloroform extraction method described hereinabove. The first 14 liters contain less than 0.5 p.p.m.; the run is continued until the effluent ABS level reaches 5 p.p.m. A total of 2.28 grams of ABS is removed by the resin.

After rinsing out the excess detergent solution, the resin column is eluted with 200 ml. of 0.72 N aqueous sodium hydroxide (equivalent to about 3 lbs. NaOH per cubic foot of resin), warmed to about 50° C. Excess alkali is washed out of the resin with about 1000 ml. of water. Analysis of the entire alkaline effluent indicates that 92 percent of the adsorbed ABS has been eluted.

EXAMPLE 2

The column of resin used in Example 1 is used again for ABS removal with the same influent. During this run, the first eleven liters of effluent show a "leakage" of 2 to 3 p.p.m. At the cutoff point (5 p.p.m.), a total of 1.35 grams of ABS has been sorbed by the resin. Treatment with the equivalent of 3 pounds of dilute aqueous NaOH per cubic foot of resin removes 92.7 percent of the influent ABS.

Examples 1 and 2 show that some removal of anionic surfactant can be achieved by a weak-base resin in the free-base form and that the sorbed material can be effectively removed from the resin by treatment with aqueous alkali. Examples 3 to 7 illustrate the higher capacities which can be obtained with the acid-salt form of the resin.

EXAMPLE 3

The resin column used in Examples 1 and 2 is exhaustively eluted with sodium hydroxide solution to remove the last traces of ABS from the preceding resins, and is then treated with 300 ml. of 4 N HCl and rinsed with one liter of tap water. Analysis of the acid effluent indicates further elution from the column of 0.08 gram of ABS.

A solution containing 120 p.p.m. ABS in tap water is put through the column. The first 35 liters of effluent contain less than 0.5 p.p.m. of ABS. The pH ranges from 2.6 initially to 6.9 toward the end of the run. After a throughput of 88 liters, a total of 10.98 grams of ABS has been removed.

Elution is carried out with the equivalent of 4 pounds of sodium hydroxide per cubic foot of resin in a 4 percent aqueous solution at a temperature of 40° C. and at a flow rate of 4 bed-volumes per hour (0.5 gallon per minute/cu. ft.). Excess alkali is rinsed out with one liter of water. The relatively concentrated effluent has a yellow tinge and is "sudsy." Analysis shows that 9.5 grams of ABS (86.6 percent) has been removed from the resin. The resin column is then treated with an additional 90 ml. of 4 percent NaOH (equivalent to 2 pounds/cu. ft.), again at 40° C. and at a rate of 4 bed-volumes per hour. This second elution yields an additional 0.85 gram of ABS, for a total recovery of 10.35 grams (94.3 percent). Obviously, more alkali is required for the acid form than for the free-base form.

EXAMPLE 4

The resin column of Example 3 is treated with 204 ml. of 1.07 N HCl (equivalent to 5 pounds HCl per cubic foot), rinsed with 2400 ml. of water, and a solution containing 120 p.p.m. ABS in water is passed through it. The results are shown graphically in FIGURE 1.

The total ABS adsorbed in this run is 12.91 grams. On elution with 4 pounds of sodium hydroxide (in a 4-percent aqueous solution) per cubic foot, 10.8 grams (83.6 percent) is recovered. Further elution with 2 pounds/cubic foot gives an additional 1.85 grams. Thus a total of 12.65 grams of ABS, or 97.9 percent, is recovered.

The middle portion of the alkaline effluent is cooled to about 8° C. and a phase separation occurs. The top phase (clear) is siphoned off and the bottom layer, containing colloidally dispersed surfactant, is evaporated to dryness. The residue consists of 15.6 grams of solids, found to be about 50 percent ABS. The top layer is treated with a few grams of sodium sulfate, resulting in the precipitation of a further quantity of ABS.

EXAMPLE 5

The resin of Example 4 is again treated with dilute hydrochloric acid (5 pounds/cu. ft.) and another run is made with the 120 p.p.m. ABS influent. In this case, the flow rate is increased in 12 bed volumes per hour (1.5 gallons per minute/cu. ft.). The 20 p.p.m. level is reached at a throughput of 71.5 liters, giving a net adsorption of 8.25 grams of ABS.

The resin column is then treated with 270 ml. of 4 percent aqueous sodium hydroxide solution and rinsed with water to make a total effluent of about 1000 ml. The displacement volume (about 50 ml.) is first discarded, and then the next 200 ml. is collected separately from the remaining 800 ml. The 200-ml. fraction is evaporated to dryness and found to contain 10.4 grams of solids, of which 4.7 grams (45 percent) are surfactant. Analysis of the 800-ml. fraction show that it contains 4.5 grams of ABS, giving a total recovery of 99.5 percent.

EXAMPLE 6

A fresh solution containing 52 p.p.m. ABS in Redwood City, California, tap water is passed through two 100-ml. columns of Duolite A–7 resin in series. The resin in the first column is that used in Examples 1 through 6; it is, however, converted to the bisulfate form by treatment with excess N sulfuric acid. The second column contains fresh Duolite A–7 resin in the free-base form. About 225 liters of solution is passed through the columns at rates ranging from 8 to 16 bed-volumes per hour (1–2 gallons per minute/cu. ft.). The effluent ABS content remains below 0.5 p.p.m. and the pH ranges from 8.2 down to 6.8.

Elution of the first column with dilute alkali (6 pounds/cu. ft.) gives 11.2 grams of ABS. The total HCl capacity of the resin after seven cycles is found to be 2.09 equivalents per liter.

EXAMPLE 7

A new 100-ml. column of Duolite A–7 resin is prepared by regeneration with 100 ml. of 4-percent NaOH. Excess alkali is rinsed out and the resin is treated with dilute HCl (5 pounds/cu. ft.) and rinsed until the effluent pH is 2.6. A solution of 10 p.p.m. of ABS in tap water is passed through the column until the effluent level reaches 1 p.p.m. At this stage, a total of 14.8 grams has has been absorbed. Elution with the equivalent of 6 pounds per cubic foot of NaOH, in a 4-percent aqueous solution, results in an ABS recovery of 94.6 percent.

A summary of the data from the examples is given in Table I.

Table 1.—Summary of ABS adsorption and elution data

| Example | Resin form | Gms. ABS adsorbed | NaOH dosage (lbs./cu. ft.) | Gms. ABS eluted | Percent ABS recovery |
| --- | --- | --- | --- | --- | --- |
| 1 | OH | 2.28 | 3 | 2.10 | 92.0 |
| 2 | OH | 1.35 | 3 | 1.25 | 92.7 |
| 3 | HCl | 10.98 | 6 | 10.35 | 94.3 |
| 4 | HCl | 12.91 | 6 | 12.65 | 97.9 |
| 5 | HCl | 8.25 | 6 | 8.20 | 99.5 |
| 6 | HSO₄ | 11.70 | 6 | 11.20 | 95.8 |
| 7 | HCl | 14.8 | 6 | 14.0 | 94.6 |

EXAMPLE 8

Tap water containing two p.p.m. ABS (from "Tide") is prepared. When a sample of this water is placed in a test tube and shaken, durable froth is produced. To one liter of this water is added one gram of minus 50-mesh "Duolite A–7" (weakly basic amine-type phenol-formaldehyde resin). The resin-water mixture is stirred mechanically for two hours. The resin is then allowed to settle in the beaker and a sample of the water is removed by decantation. On shaking the tube, it is observed that the tendency to foam is gone.

EXAMPLE 9

Aqueous solutions at room temperature containing ABS are run down-flow through vertical columns of resin particles and the results determined by analysis of the effluent.

An influent solution is prepared by dissolving "Oronite D–40," a commercial detergent consisting of 40 percent ABS and 60 percent sodium sulfate, in tap water. This solution is run through each of three 50-milliliter resin beds contained in one-inch diameter glass tubes. The resin used is of standard particle-size range, 20 to 50 mesh. The weak-base "Duolite A–7" is treated with excess 2 N HCl and washed with water to constant pH to convert it thoroughly to the chloride form.

Analysis of the prepared influent indicated the following anionic composition:

ABS _____ 100 p.p.m. (as ABS).
Chloride _____ 26 p.p.m (as CaCo₃).
Sulfate _____ 118 p.p.m. (as CaCo₃).
Bicarbonate _____ 40 p.p.m. (as CaCo₃).

The flow rate in each case is maintained at 0.5 gallon per minute per cubic foot of resin. Effluent samples after complete separation from the respective beds are analyzed periodically during the run. It is observed that the A-7 resin effectively removes ABS from nearly 1500 volumes of influent per volume of resin before appreciable amounts of ABS are found in the effluent, commonly known in the ion-exchange art as "breakthrough."

EXAMPLE 10

The procedure described hereinafter is used to compare several weak-base resins with regard to their efficiency of ABS-removal from water. The compositions of the resins to which reference is made are as follows:

Duolite A-2 ────────┐
Duolite A-7 ────────┤ Phenolic polyamine.
Duolite A-30B ──────┐
Duolite ES-57 ──────┤ Epoxy-polyamine.
Amberlite IR-45 ────┘
Amberlite XE-225 ───┐ Polystyrene polyamine.
Lewatit MP-60 ──────┘
Amberlite XE-168 ──────── Aminolyzed cross-linked polymethyl methacrylate.
Dowex 4 ──────────── Epi-amine polymer.

Figure 3:
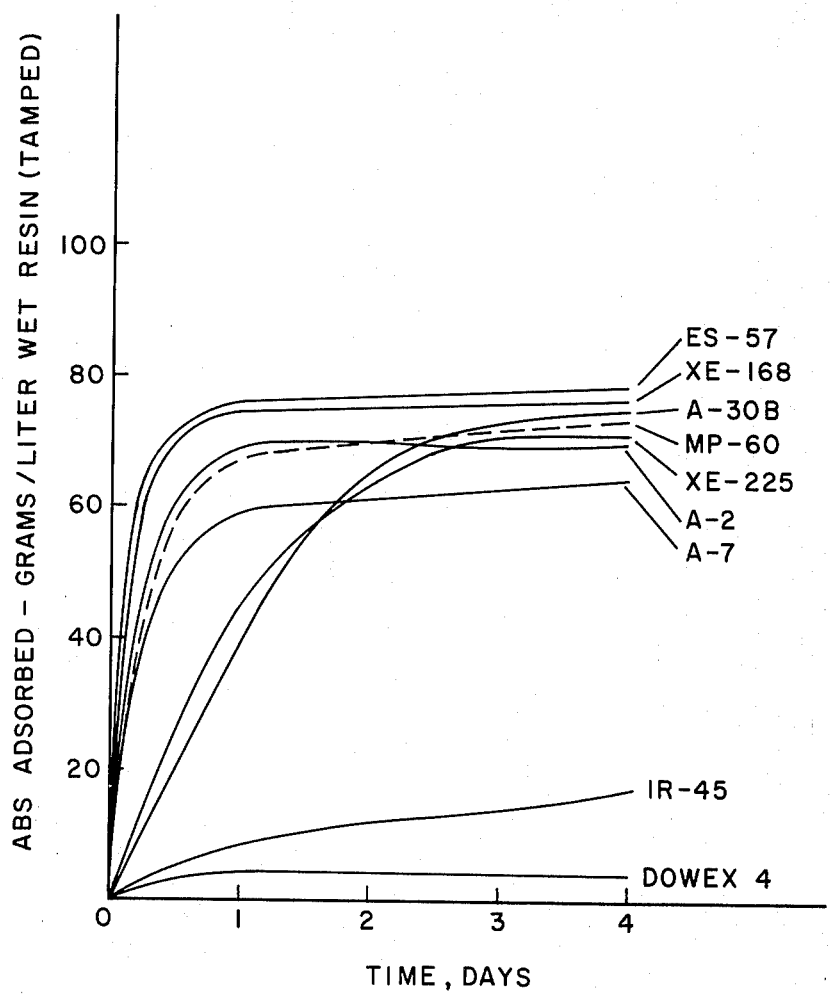

The resin is washed with hydrochloric acid to convert it to the acid-salt form and is then screened to obtain a sample of between 30 and 40 mesh. The approximate tamped volume of a moist one-gram sample of resin is determined. A moisture determination is made on a separate sample. The resin sample is then stirred at room temperature with one liter of a 100-p.p.m. ABS solution. Periodic determinations of the ABS content of pH of the solution are made until equilibrium is reached. The results are given in Table II and shown graphically in FIGURE 3.

While the invention has been described with particular reference to specific embodiments thereof, it is not to be so limited, since changes and modifications therein may be made which are within the full intended scope of the invention as defined by the appended claims.

What is claimed is:

1. The method for removing anionic surfactants from water which comprises contacting water containing anionic surfactants with a weak-base anion-exchange resin in the acid-salt form.

2. The method according to claim 1 wherein the surfactant is removed from the resin by contacting the same with an aqueous alkali solution.

3. The method according to claim 2 wherein the alkali-contacted resin is treated with acid to reconvert it to the acid-salt form.

4. A method for the removal of anionic surfactants from water which comprises passing said water through a bed of weak-base anion-exchange resin in the acid-salt form, and passing the effluent from said bed through a second bed containing a weak-base anion-exchange resin in the free-base form.

5. The method according to claim 4 wherein, after the first bed is saturated with surfactant, it is regenerated by contacting it with aqueous alkali and the influent flow to the two beds in interchanged.

6. The method of removing anionic surfactants dissolved in a body of water also containing the usual salts present in natural waters dissolved therein, which comprises effecting intimate contact between the water body and a weak-base anion-exchange resin in the acid-salt form, to extract said anionic surfactants from the water in preference to said salts and thereby substantially to prevent foaming of the water otherwise caused by said anionic surfactants.

7. The method of claim 6 wherein the resin is in the

Table II.—Equilibrium adsorption of ABS by various resins in chloride form as a function of time

| Anion exchanger | Wgt. moist resin, gm. | Tamped volume, cc. | Wgt. resin dry, gm. | ABS equilibrium removal | | | | | | | | | Final pH |
|---|---|---|---|---|---|---|---|---|---|---|---|---|---|
| | | | | 1-day | | | 3-days | | | 4-days | | | |
| | | | | Mg./wet gm. | Mg./ml. | Mg./dry gm. | Mg./wet gm. | Mg./ml. | Mg./dry gm. | Mg./wet gm. | Mg./ml. | Mg./dry gm. | |
| Duolite A-7 | 1.00 | 1.68 | 0.377 | 99 | 59 | 262 | 105 | 63 | 278 | 108 | 65 | 286 | 5.9 |
| Duolite A-30B | 1.00 | 1.42 | 0.470 | 58 | 41 | 123 | 103 | 73 | 219 | 107 | 75 | 227 | 5.8 |
| Duolite A-2 | 1.00 | 1.52 | 0.410 | 106 | 70 | 260 | 105 | 69 | 256 | 107 | 71 | 262 | 6.0 |
| Duolite ES-57 | 1.00 | 1.41 | 0.386 | 107 | 76 | 280 | 109 | 78 | 285 | 109 | 78 | 285 | 6.1 |
| Amberlite IR-45 | 1.00 | 1.53 | 0.633 | 13 | 9 | 21 | 20 | 13 | 32 | 26 | 17 | 41 | 3.9 |
| Amberlite XE-168 | 1.00 | 1.43 | 0.380 | 107 | 75 | 283 | 108 | 76 | 286 | 109 | 76 | 288 | 5.8 |
| Amberlite XE-225 | 1.00 | 1.48 | 0.377 | 66 | 45 | 175 | 105 | 71 | 279 | 105 | 71 | 279 | 6.0 |
| Dowex 4 (WGR) | 1.00 | 1.52 | 0.410 | 8 | 5 | 19 | 6 | 4 | 15 | 6 | 4 | 15 | 5.7 |
| Lewatit MP-60 | 1.00 | 1.50 | 0.430 | 104 | 69 | 242 | 109 | 73 | 256 | 109 | 73 | 254 | 5.8 |

The results of elution tests with dilute caustic soda on the resins set forth in Table III are as follows:

Table III

| Resin | Milligrams ABS per wet gram adsorbed on resin | Milligrams ABS per wet gram removed on regeneration | Percent ABS removed from resin |
|---|---|---|---|
| A-7 | 108 | 100 | 92 |
| A-2 | 107 | 106 | 99 |
| A-30-B | 107 | 6 | 6 |
| XE-168 | 109 | 42 | 38 |
| XE-225 | 105 | 56 | 47 |
| ES-57 | 109 | 10 | 9 |
| MP-60 | 109 | 46 | 42 | form of particles, and said intimate contact is effected in a slurry of the water body and said particles.

8. The method of claim 6 wherein the resin is in the form of particles, and said intimate contact is effected by effecting flow of the water body through a bed of said resin.

9. The method of claim 6 wherein the anionic surfactant is an alkyl benzene sulfonate which is removed from the resin by eluting the resin with an aqueous alkali.

10. The method of claim 1 wherein the water body is a member of the group consisting of tap, stream, well, industrial waste and laundry effluent water.

11. The method according to claim 5 wherein the aqueous alkali is maintained at an elevated temperature below about 60° C.

12. The method of precluding impairment of the sewage-disposal process caused by the presence of anionic surfactant contained in sewage water which comprises passing said sewage water through a bed of particles of a weak-base anion exchange resin in the acid-salt form, thereby extracting said anionic surfactant from said sewage water.

13. The method of claim 6 wherein the anion exchange resin is an amine-containing phenol-formaldehyde resin.

14. The method of claim 12 wherein the anionic surfactant is an alkyl benzene sulfonate.

References Cited by the Examiner

UNITED STATES PATENTS 3,030,411 4/1962 Leum et al. _____ 260—505
3,123,553 3/1964 Abrams _____ 210—30

OTHER REFERENCES

Ginn et al.: "New Columnar and Mixed-Bed Ion Exchange Methods for Surfactant Analysis and Purification" (pages 551–555 relied upon), Analytical Chemistry, vol. 31, No. 4, Jan.–April 1959.

MORRIS O. WOLK, *Primary Examiner.*